July 10, 1934.  O. WECHSBERG  1,965,717
AIR FILTER
Filed July 19, 1933  3 Sheets-Sheet 1

Inventor:
Otto Wechsberg
By Geo. H. Kennedy Jr.
Attorney

July 10, 1934.  O. WECHSBERG  1,965,717
AIR FILTER
Filed July 19, 1933   3 Sheets-Sheet 2

Inventor:
Otto Wechsberg
by Geo. H. Kennedy Jr.
Attorney

July 10, 1934.  O. WECHSBERG  1,965,717
AIR FILTER
Filed July 19, 1933  3 Sheets-Sheet 3

Inventor:
Otto Wechsberg
By Geo. W. Kennedy Jr.
Attorney

Patented July 10, 1934

1,965,717

UNITED STATES PATENT OFFICE 1,965,717

AIR FILTER

Otto Wechsberg, Worcester, Mass.

Application July 19, 1933, Serial No. 681,173

3 Claims. (Cl. 183—63)

The present invention relates to a self-cleaning air filter of the dry type in which the filter curtain is advanced past a cleaning device during the cleaning period.

In this type of air filter, the curtain, through which the air is passed for cleaning, comprises an endless belt which is supported by rolls in the form of one or more loops. The differential in air pressure which exists on opposite sides of the curtain, and the tension on the curtain, cause the latter to bulge at the center and to contract toward the center, eventually drawing the edges of said curtain away from the guides, and thus destroying the air seal at said edges, thereby permitting unclean air to pass around said curtain without being filtered. One of the principal objects of the present invention is to prevent the filter belt from contracting toward the center, thereby maintaining the air seal at the edges thereof during the entire life of the curtain.

The filter curtain is advanced during the cleaning thereof by a positive rotation of certain of the rolls over which the curtain or belt is supported. The traction between the belt and the rolls is not always sufficient to overcome the frictional drag on the curtain resulting from the structure by which the air seal at the opposite edges of the curtain is obtained. A further object of the present invention is, accordingly, to provide for increasing the traction between the filter curtain and the rolls by which the curtain is advanced in order to obtain a positive advance of the curtain.

Other objects and advantages of the invention will appear from the following detailed description taken in connection with the accompanying drawings in which:—

Like reference characters refer to like parts in the different figures.

The filter, which is built as a complete self-contained unit, is arranged to be mounted in a ventilating tunnel 1 or any other structure or opening through which air is passed, and the filter is arranged to remove dirt and other impurities from the air as it is passed therethrough. The tunnel 1 discloses only one type of installation of the filter; it will be apparent that several filter units might be positioned side by side for filling the tunnel if the latter were of larger size, or the filter unit may be mounted in any other structure wherever it is found desirable.

Figures 1, 2:
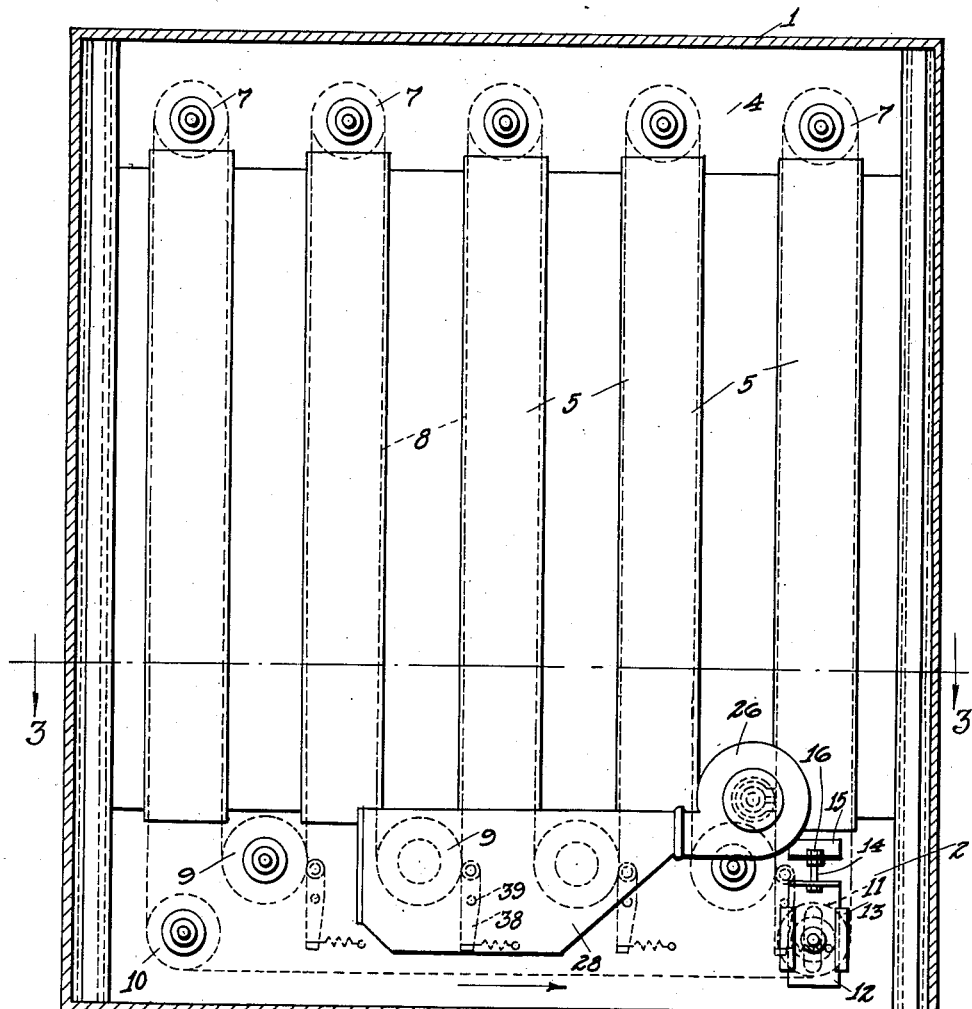
Fig. 1 is a front elevation of a filter embodying the invention.
Fig. 2 is a fragmentary elevation of the filter as seen from the rear or discharge side.

The filter unit comprises spaced parallel plates 2 and 3 adjacent the bottom thereof and similar spaced plates 4 (only one of which is shown) adjacent the top of the unit, the plates 2 and 3 being connected to the plates 4 by vertical channel shaped members 5 whose functions will appear hereinafter and by other vertical connecting plates 6, Fig. 3, at opposite sides of the filter. The plates 4 provide journals for the opposite ends of a plurality of spaced parallel horizontal rolls 7 over which the filter curtain 8 passes and the plates 2 and 3 provide journals for the opposite ends of corresponding parallel horizontal rolls 9. The latter are mounted in staggered vertical relation to the rolls 7, and the filter curtain 8 passes alternately over the top and bottom rolls to form a plurality of loops in the curtain, said loops providing vertical sections of the curtain through which the air is filtered. The bottom plates 2 and 3 are also provided with supporting rolls 10 and 11 which carry the filter curtain transversely of the unit and beneath the rolls 9 to provide a support for the curtain between the first and last loop supporting rolls 7. As shown in Figs. 1 and 2, the ends of the roll 11 are journaled in slides 12 mounted for vertical movement in guideways 13 on the plates 2 and 3, to provide for adjustment of said roll, thereby permitting the curtain to be maintained at the desired tension at all times. The position of each slide 12 is determined by a bolt 14 engaging said slide, and held in position by a bracket 15 on the plate 2 (or 3), said bolt being held against movement in said bracket by locking nuts 16.

As best shown in Fig. 2, the lower rolls 9 are positively driven for movement of the filter curtain during the cleaning thereof. Referring to this figure, one end of each of the rolls 9 has a sprocket 17 over which a chain 18 passes, the latter being maintained under proper tension by idler sprockets 19 journaled on studs supported by the plate 3. One of the rolls 9 carries a second sprocket 20, Fig. 3, over which a chain 21 passes, the latter also passing over a sprocket 22 on the driven shaft of a conventional reduction gear mechanism 23. The reduction gear mechanism is driven by an electric motor 24 mounted on the plate 3. The motor may be manually started and stopped for controlling the movement of the filter curtain for cleaning, or said motor may be controlled by any suitable gage structure which determines the differential in air pressure on opposite sides of the filter curtain. The particular control mechanism for the motor 24 is immaterial and not a part of the present invention.

The device has a suction nozzle 25 extending horizontally of the device adjacent to one of the vertical sections of the filter curtain to provide for cleaning of said curtain during the movement of the latter past said nozzle by the motor 24. Suction in the nozzle 25 is provided by an electric fan or blower 26 actuated by a motor 27 mounted on the plate 2, the exhaust for the blower 26 passing into a bag 28 which collects the dirt removed from the curtain.

Figure 3:
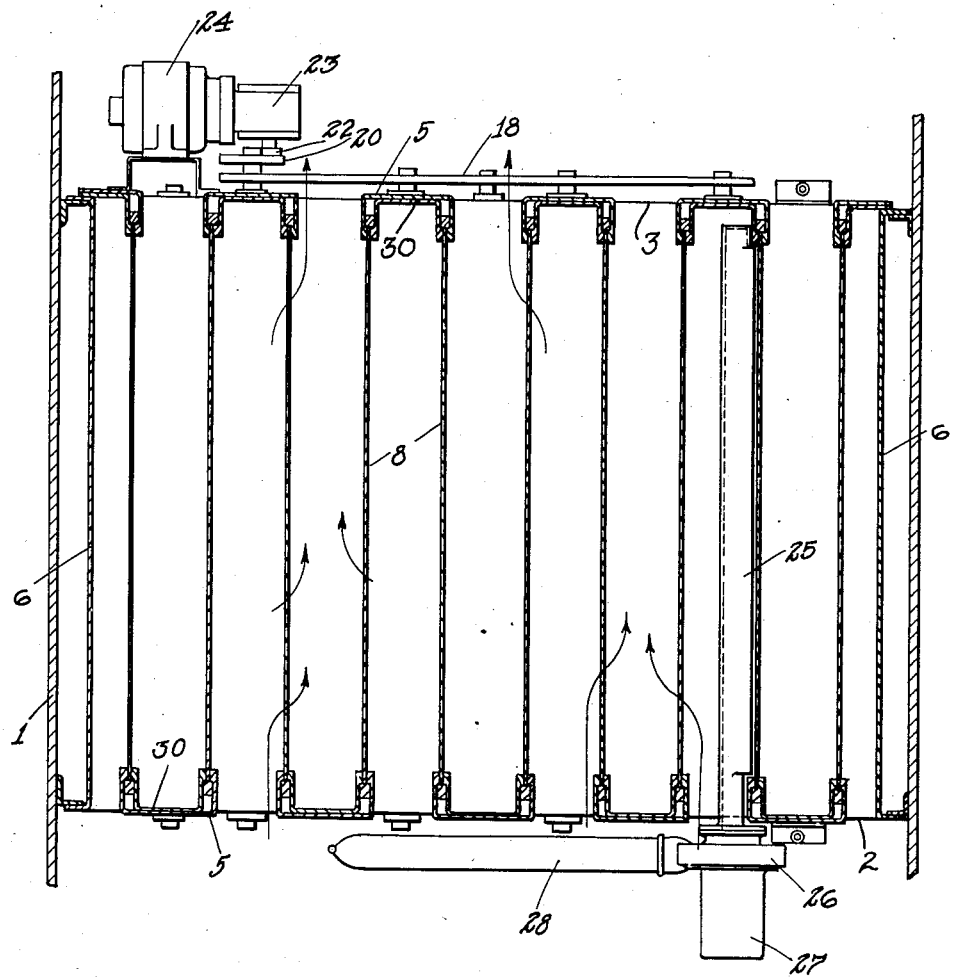
Fig. 3 is a horizontal section through the filter.
Figure 4:
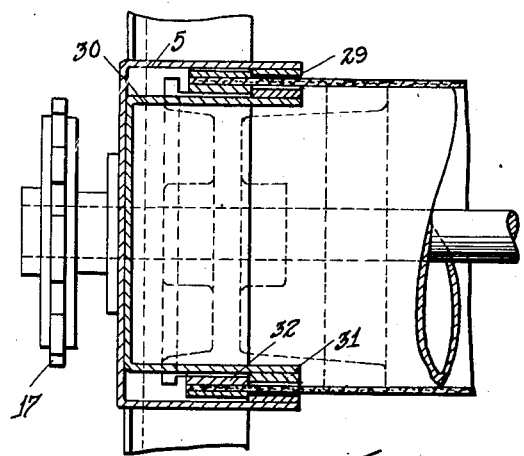
Fig. 4 is a horizontal section along the line 4—4 of Fig. 2.

As indicated by the arrows in Fig. 3, the impure air enters one side of the device between adjacent channel members 5, passes through the filter curtain, and out the opposite side of the device between adjacent channel members 5, the latter members being positioned in staggered relation to the members 5 on the intake side of the device. The differential in air pressure existing on opposite sides of each of the vertical sections of the filter curtain cause the curtain to bulge at the center tending to bring the opposite edges of the curtain toward each other eventually breaking the air seal at each edge thereof. The present device is arranged to eliminate any narrowing of the filter curtain and thus maintains an effective air seal at all times. As shown in Fig. 3, and in a larger section in Fig. 4, each channel shaped member 5 which extends from a point directly above the rolls 9 to the plates 4 has a flange 29 on the inner side of each leg thereof. Within each channel member 5 is positioned a corresponding and narrower channel member 30 which has a flange 31 on the outside of each leg thereof in opposed relation to the flange 29 of the member 5, these flanges 29 and 31 being spaced apart sufficiently to permit the edge of the filter curtain to extend therebetween. The extreme edges of the filter curtain are reinforced by strips of material 32 on opposite sides thereof, said strips being either of leather, steel or other suitable material. The edges of the strips 32, as will be apparent, engage the flanges 29 and 31, and the latter accordingly support the edges of the curtain against movement inwardly to maintain the curtain at the proper width at all times. To accommodate the strips 32, the opposite ends of the rolls 7 and 9 are provided with annular grooves 33 into which the strips 32 are guided by the flanges 29 and 31.

Figure 6:
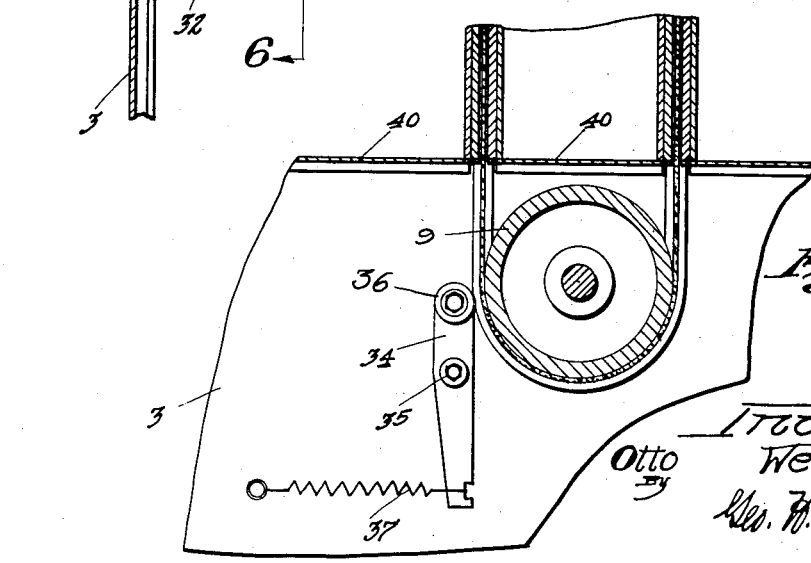
Fig. 6 is a fragmentary vertical section substantially along the line 6—6 of Fig. 5.

Referring now to Fig. 6, a lever 34 journaled on a stud 35 on the plate 3 carries a roller 36 which engages the filter curtain adjacent the edge thereof and urges the latter against the roll 9. A spring 37, having one end secured to the lever 34 and the other end secured to the plate 3, urges the roller 36 against the belt, at a predetermined pressure, to obtain a sufficient traction between the roll 9 and the belt to insure a positive advance of said belt when the roll is rotated. A similar lever is provided, as shown in Fig. 2, for each of the rolls 9 for engagement with one edge of the filter curtain and corresponding levers 38 journaled on studs 39 on the plate 2 engage the opposite edge of the curtain to hold the latter against the rolls 9 at the other ends thereof. These levers sufficiently increase the traction between the filter curtain and the rolls 9 to provide for positive movement of the filter curtain during the rotation of said rolls.

Figure 5:
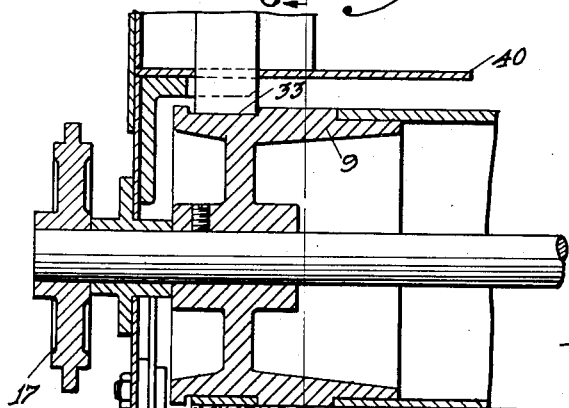
Fig. 5 is a vertical section along the line 5—5 of Fig. 2.

As shown in Figs. 5 and 6, the upper edges of the plates 2 and 3 are connected by horizontal plates 40 which extend between adjacent vertical sections of the filter curtain to close the lower end of the device and prevent the air being filtered from passing thereinto. Similar plates, not shown, extend between the lower edges of the plates 4 at the top of the device for preventing movement of air upwardly beyond the lower edges of said plates. The movement of the air through the device is thus definitely limited to movement horizontally through vertical chambers defined on top and bottom by the plates, above referred to, and it is impossible for unclean air to pass, by any circuitous route, through the air filter and mix with the clean air on the discharge side of said filter.

From the foregoing, it will be apparent that the present invention provides an air filter of the dry type in which the curtain is maintained at its proper width during the life of the curtain, with an effective air seal provided at opposite edges of the curtain to prevent air from passing through the filter without being subjected to a cleaning and filtering action. In addition, the levers 34 provide for increasing the traction between the filter curtain and the drive rolls for overcoming the drag on the curtain resulting from the action of the suction nozzle or from the air-seal construction, above disclosed, so that the curtain is positively advanced during the rotation of the driving rolls.

I claim,

1. In an air filter construction, a continuous curtain of filter material, rolls supporting said curtain and having grooves therein, one of said rolls being a driving roll, means on the curtain for engaging said grooves, and a roller for pressing said means on the curtain into the groove and against the driving roll for obtaining a greater attraction between the curtain and roll.

2. In an air filter construction, a continuous curtain of filter material, rolls supporting said curtain, at least one of said rolls being a driving roll, and means for pressing said curtain against the driving roll with a predetermined pressure for obtaining a traction between the curtain and roll.

3. In an air filter construction, a continuous curtain of filter material, rolls supporting said curtain and having grooves therein, a belt secured to and extending along at least one edge of the curtain throughout its length for engagement in the grooves of the rolls for maintaining the curtain in proper position, and means for pressing said belt into the grooves of at least one of the rolls for obtaining a greater traction between the curtain and the roll.

OTTO WECHSBERG.

CERTIFICATE OF CORRECTION.

Patent No. 1,965,717.  July 10, 1934.

OTTO WECHSBERG.

It is hereby certified that error appears in the printed specification of the above numbered patent requiring correction as follows: Page 2, line 125, claim 1, for "attraction" read traction; and that the said Letters Patent should be read with these corrections therein that the same may conform to the record of the case in the Patent Office.

Signed and sealed this 7th day of August, A. D. 1934.

Leslie Frazer (Seal)  Acting Commissioner of Patents.